(12) United States Patent
Yu et al.

(10) Patent No.: US 12,270,972 B2
(45) Date of Patent: Apr. 8, 2025

(54) OPTICAL LENS, CAMERA MODULE AND TERMINAL

(71) Applicant: JIANGXI LIANYI OPTICS CO., LTD., Nanchang (CN)

(72) Inventors: Xiaozhi Yu, Nanchang (CN); Haojie Zeng, Nanchang (CN); Xuming Liu, Nanchang (CN); Jiyong Zeng, Nanchang (CN)

(73) Assignee: JIANGXI LIANYI OPTICS CO., LTD., Nanchang (CN)

( * ) Notice: Subject to any disclaimer, the term of this patent is extended or adjusted under 35 U.S.C. 154(b) by 842 days.

(21) Appl. No.: 17/376,196

(22) Filed: Jul. 15, 2021

(65) Prior Publication Data
US 2021/0364758 A1    Nov. 25, 2021

Related U.S. Application Data

(63) Continuation-in-part of application No. PCT/CN2021/088766, filed on Apr. 21, 2021.

(30) Foreign Application Priority Data

May 21, 2020  (CN) .......................... 202010433363.X

(51) Int. Cl.
*G02B 13/00*   (2006.01)
*G02B 9/62*    (2006.01)

(52) U.S. Cl.
CPC ........... *G02B 13/0045* (2013.01); *G02B 9/62* (2013.01)

(58) Field of Classification Search
CPC ...... G02B 13/0045; G02B 9/62; G02B 13/18; G02B 15/1461; G02B 27/0012
See application file for complete search history.

(56) References Cited

U.S. PATENT DOCUMENTS 9,563,038 B2   2/2017  Tsai et al.
2016/0116715 A1  4/2016  Ota

FOREIGN PATENT DOCUMENTS

CN    202522758    11/2012
CN    103777310 A   5/2014
(Continued)

OTHER PUBLICATIONS

SIPO, First Office Action for CN Application No. 202010433363.X, Jul. 2, 2020.
(Continued)

*Primary Examiner* — Wyatt A Stoffa
*Assistant Examiner* — Ray Alexander Dean
(74) *Attorney, Agent, or Firm* — JEEN IP LAW, LLC

(57) ABSTRACT

The disclosure provides an optical lens, a camera module and a terminal. The optical lens sequentially includes: a stop; a first lens with positive focal power, a convex object side surface, and an image side surface with a concave paraxial region; a second lens with negative focal power, a concave image side, and an object side surface with a convex paraxial region; a third lens with a positive focal power, both an object surface and an image surface are concave at a paraxial region thereof; a fourth lens with a negative focal power, a concave object side surface and a convex image side surface; a fifth lens with positive focal power, an object surface and an image surface are convex at a paraxial region thereof; and a sixth lens with a negative focal power, bath an object surface and an image surface are concave at a paraxial region thereof.

19 Claims, 10 Drawing Sheets

(56) References Cited

FOREIGN PATENT DOCUMENTS

| | | | |
|---|---|---|---|
| CN | 104898257 | A | 9/2015 |
| CN | 105319687 | A | 2/2016 |
| CN | 205374856 | U * | 7/2016 |
| CN | 106802471 | A | 6/2017 |
| CN | 208013523 | U | 10/2018 |
| CN | 109270665 | A | 1/2019 |
| CN | 109669258 | A | 4/2019 |
| CN | 111338060 | A | 6/2020 |
| JP | 2014232147 | A | 12/2014 |

OTHER PUBLICATIONS

SIPO, Office Action issued for CN Application No. 202010433363. X, Jul. 22, 2020.
WIPO, Written opinion of the International Search Authority for PCT Application No. PCT/CN2021/088766, Jul. 8, 2021.
WIPO, International Search Report for PCT Application No. PCT/CN2021/088766, Jul. 8, 2021.

* cited by examiner

OPTICAL LENS, CAMERA MODULE AND TERMINAL

CROSS-REFERENCE TO RELATED APPLICATION

This application is a continuation-in-part of an international application No. PCT/CN2021/088766 filed on Apr. 21, 2021, This international application No. PCT/CN2021/088766 claims priority to a CN application No. 202010433363.X filed on May 21, 2020. The entirety of the above-mentioned applications is hereby incorporated by reference for all purposes.

TECHNICAL HELD

The disclosure relates to the field of lens imaging technologies, and particularly to an optical lens, a camera module and a terminal.

BACKGROUND

At present, with the popularity of portable electronic devices (such as a smart phone, a camera), coupled with the popularity of social, video and live-broadcasting software, people's degree of liking the photography is becoming higher and higher. A camera lens has become a standard for the portable electronic devices, and camera lens has even become a primary consideration indicator when consumers purchasing the portable electronic devices.

With continuous development of mobile information technology, the portable electronic devices such as a mobile phone is developing in the direction of thinness and lightness, full-screen, ultra-high definition imaging and etc., which puts higher requirements for the camera lens mounted on the portable electronic device. In recent years, with consumers' enthusiasm for the mobile phone with full-screen, a front lens pursues visual simplicity in addition to a requirement of high resolution. Because the existing camera lens has large outer diameter of a front portion and entity volume, it appears "notch screen". However, the larger notch area, that is, the larger notch area on a mobile phone screen, thereby the screen-to-body ratio cannot be further improved.

SUMMARY

In a first aspect, an optical lens is provided in the embodiments of the disclosure. Along an optical axis from an object side to an imaging surface, the optical lens sequentially includes: a stop, a first lens, a second lens, a third lens, a fourth lens, a fifth lens and a sixth lens. The first lens has a positive focal power, an object side surface of the first lens is convex, a paraxial region of an image side surface of the first lens is concave and the image side surface of the first lens has at least one inflection point. The second lens has a negative focal power, a paraxial region of an object side surface of the second lens is convex, and an image side surface of the second lens is concave. The third lens has a positive focal power, a paraxial region of an object side surface of the third lens is convex, and an image side surface of the third lens is convex. The fourth lens has a negative focal power, an object side surface of the fourth lens is concave, and an image side surface of the fourth lens is convex. The fifth lens has a positive focal power, a paraxial region of an object side surface of the fifth lens is convex, and a paraxial region of an image side surface of the fifth lens is convex, and both the object side surface and the image side surface of the fifth lens have at least one inflection point. The sixth lens has a negative focal power, a paraxial region of an object side surface of the sixth lens is concave, a paraxial region of an image side surface of the sixth lens is concave, and the image side surface of the sixth lens has at least one inflection point. The first lens, the second lens, the third lens, the fourth lens, the fifth lens and the sixth lens are aspherical lenses. The optical lens meet the expression: 4.4 mm<(TTL/IH)×f<4.6 mm; where TTL represents a distance on the optical axis from the object side surface of the first lens to the imaging surface, IH represents half an actual image height of the optical lens on the imaging surface, and f represents a focal length of the optical lens.

In a second aspect, an imaging device is provided in the embodiments of the disclosure, which includes an imaging element and the optical lens provided in the first aspect. The imaging element is configured to convert an optical image formed by the optical lens to an electronic signal.

In a third aspect, a camera module is provided in the embodiments of the disclosure, which includes the optical lens described above and an image sensor opposite to the optical lens.

In a fourth aspect, a terminal is provided in the embodiments of the disclosure, which includes a camera module, a processor, and a housing. The camera module and the processor are received in the housing, the camera module is configured to capture images, the processor is configured to process the images, the camera module includes the optical lens described above and an image sensor opposite to the optical lens.

BRIEF DESCRIPTION OF THE DRAWINGS

In order to more clearly illustrate technical solutions in the embodiments of the disclosure, drawings to be used in the embodiments are briefly described below. It should be understood that the following drawings are merely some embodiments of the disclosure, therefore it should not be seen as a qualification of the scope. Those skilled in the art can obtain other figures according to these figures without paying any creative effort.

DETAILED DESCRIPTION OF PREFERRED EMBODIMENTS

Figure 1:
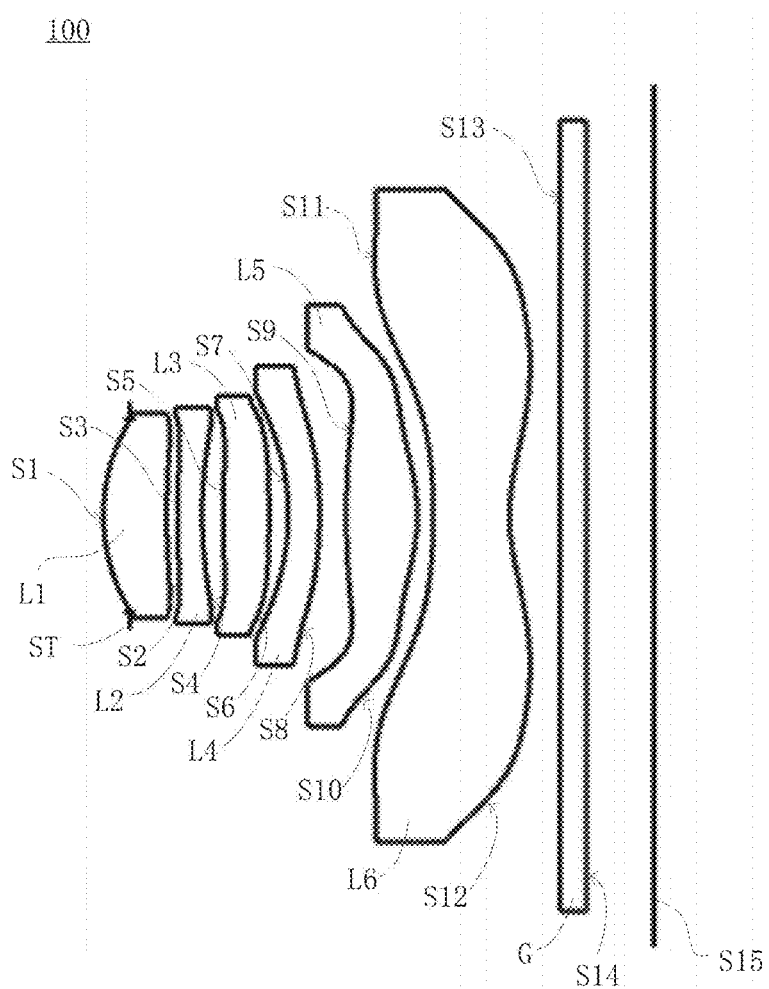
FIG. 1 is a schematic structural diagram of an optical lens according to an embodiment of the disclosure.

In order to facilitate understanding of the disclosure, the disclosure will be described comprehensively below with reference to the related drawings. Various embodiments of the disclosure are shown in the drawings. However, the disclosure can be implemented in many different forms and is not limited to the embodiments described herein. Rather, the purpose of providing these embodiments is to make the disclosure more thorough and comprehensive.

FIG. 1 shows a schematic structural diagram of an optical lens 100 according to an embodiment of the disclosure. Along an optical axis from an object side to an image side, the optical lens 100 sequentially includes: a stop ST, a first lens L1, a second lens L2, a third lens L3, a fourth lens L4, a fifth lens L5, a sixth lens L6 and a filter G. The image side here refers to a side of the optical lens 100 where an imaging surface S15 locates, and the object side is opposite to the image side.

The first lens L1 has a positive focal power, an object side surface S1 of the first lens L1 is convex, a paraxial region of an image side surface S2 of the first lens L1 is concave, and the image side surface S2 has at least one inflection point.

The second lens L2 has a negative focal power, a paraxial region of an object side surface S3 of the second lens L2 is convex and an image side surface S4 of the second lens L2 is concave.

The third lens L3 has a positive focal power, a paraxial region of an object side surface S5 of the third lens L3 is convex, and an image side surface S6 of the third lens L3 is convex.

The fourth lens L4 has a negative focal power, an object side surface S7 of the fourth lens L4 is concave, and an image side surface S8 of the fourth lens L4 is convex.

The fifth lens L5 has a positive focal power, a paraxial region of an object side surface S9 of the fifth lens L5 is convex, a paraxial region of an image side surface S10 of the fifth lens L5 is convex, and both the object side surface S9 and the image side surface S10 of the fifth lens L5 have at least one inflection point.

The sixth lens L6 has a negative focal power, a paraxial region of an object side surface S11 of the sixth lens L6 is concave, a paraxial region of an image side surface S12 of the sixth lens L6 is concave and the image side surface S12 of the sixth lens L6 has at least one inflection point.

In some embodiments, the optical lens 100 satisfies the following expression:

$$4.4 \text{ mm} < (TTL/IH) \times f < 4.6 \text{ mm}; \quad (1)$$

where TTL represents a distance on the optical axis from the object side surface S1 of the first lens L1 to the imaging surface S15, IH represents half an actual image height of the optical lens 100, and f represents a focal length of the optical lens 100. It can be understood that the half actual image height of the optical lens 100 refers to the half actual image height of the optical lens 100 on the imaging surface S15.

When the expression (1) is satisfied, an effective focal length and a total optical length of the optical lens 100 can be reasonably controlled, which facilitates shortening the total optical length of the optical lens 100 and the miniaturization of the optical lens 100.

In some embodiments, the optical lens 100 satisfies the following expression:

$$0.3 < CT1/DM1 < 0.35; \quad (2)$$

where CT1 represents a center thickness of the first lens L1, and DM1 represents a diameter of the object side surface S1 of the first lens L1.

When the expression (2) is satisfied, the optical lens is enabled to have a small front size and a portable electronic device is enabled to reduce a screen notch area, which facilitates the miniaturization of a front portion of the optical lens and improves a screen-to-body ratio of the portable electronic device.

In some embodiments, the optical lens 100 satisfies the following expression:

$$3.23 \text{ mm} < IH/\tan(HFOV) < 3.48 \text{ mm}; \quad (3)$$

where IH represents the half actual image height of the optical lens 100, and HFOV represents half the maximum FOV (field of view) of the optical lens 100.

The expression (3) limits distortions of the optical lens 100. When IH/tan(HFOV)>3.23 mm, the distortions of the optical lens is avoided to increase in a negative direction, and when IH/tan(HFOV)<3.48 mm, the distortions of the lens is avoided to increase excessively in a positive direction, thereby reducing the difficulty of distortion correction. When the expression (3) is satisfied, the total optical length of the optical lens 100 can be reasonably controlled, meanwhile it is conducive to reducing the difficulty of distortion correction of the optical lens 100.

In some embodiments, the optical lens 100 satisfies the following expression:

$$2.1 < f/EPD < 2.3; \quad (4)$$

where f represents the focal length of the optical lens 100, and EPD represents an entrance pupil diameter of the optical lens 100.

When the expression (4) is satisfied, the luminous flux of the optical lens 100 can be reasonably controlled, which is conducive to reducing aberrations of the optical lens 100 and improving the resolution of the optical lens 100.

In some embodiments, the optical lens 100 satisfies the following expression:

$$0.02 \text{ mm} < SAG2_{max} - SAG2 < 0.04 \text{ mm}; \quad (5)$$

where $SAG2_{max}$ represents the maximum sagittal depth of the image side surface S2 of the first lens L1, and SAG2 represents a fringe sagittal depth of the image side surface S2 of the first lens L1.

When the expression (5) is satisfied, it is conducive to correcting distortions and aberrations of a margin field, and improving a resolution of the margin field of the optical lens 100.

In some embodiments, the optical lens 100 satisfies the following expressions:

$$0.4 < f1/f3 < 0.6; \quad (6)$$

$$-3.6 < f2/f < -2.5; \quad (7)$$

$$-0.95 < f6/f5 < 0; \quad (8)$$

where f represents the focal length of the optical lens 100, f1 represents a focal length of the first lens L1, f2 represents a focal length of the second lens L2, f3 represents a focal length of the third lens L3, f5 represents a focal length of the fifth lens L5, and f6 represents a focal length of the sixth lens L6.

When the expressions (6), (7) and (8) are satisfied, the focal power of each lens can be reasonably allocated, thereby reducing the difficulty in correcting high-order aberrations and reducing the total optical length of the optical lens 100.

In some embodiments, the optical lens 100 can satisfies the following expressions:

$$2.5 < (R3+R4)/(R3-R4) < 3.9; \quad (9)$$

$$0 \text{ mm} < SAG4_i < 0.08 \text{ mm}; \quad (10)$$

where R3 represents a radius of curvature of the object side surface S3 of the second lens L2, R4 represents a radius of curvature of the image side surface S4 of the second lens L2, $SAG4_i$ represents a sagittal depth of a point on the image side surface S4 of the second lens L2 and i represents a distance from the point to the optical axis, i.e., the sagittal depth of the image side surface S4 of the second lens L2 at any point.

When the expressions (9) and (10) are satisfied, surface shapes of the second lens L2 are reasonably controlled, a sensitivity of the optical lens 100 is reduced, meanwhile, the difficulty of correcting the field curvature is reduced.

In some embodiments, the optical lens 100 can satisfies the following expression:

$$0.09 < CT4/DM7 < 0.16; \quad (11)$$

where CT4 represents a center thickness of the fourth lens L4, and DM7 represents a diameter of the object side surface S7 of the fourth lens L4.

When the expression (11) is satisfied, a diameter of the fourth lens L4 is reasonably controlled, which facilitates reducing a sensitivity of the fourth lens L4 and improves the production yield.

In some embodiments, the optical lens 100 can satisfies the following expressions:

$$0.32 \text{ mm} < SAG9_1 - SAG9 < 0.4 \text{ min} \quad (12)$$

$$0.5 < (R9+R10)/(R9-R10) < 0.8, \quad (13)$$

where $SAG9_1$ represents a sagittal depth of the object side surface S9 of the fifth lens L5 at the inflection point, SAG9 represents a fringe sagittal depth of the object side surface S9 of the fifth lens L5, R9 represents a radius of curvature of the object side surface S9 of the fifth lens L5, R10 represents a radius of curvature of the image side surface S10 of the fifth lens L5.

Satisfying the expressions (12) and (13) is conducive to correcting the field curvature and aberrations of the optical lens 100 and improves the resolution of the margin field, meanwhile it facilitates shortening the total optical length of the optical lens 100 and realizing the miniaturization of the optical lens 100.

In some embodiments, the optical lens 100 can satisfies the following expressions:

$$1.8 < CT5/CT4 < 2.3; \quad (14)$$

$$0.45 \text{ mm} < CT34 + CT45 + CT56 < 0.5 \text{ mm}; \quad (15)$$

where CT4 represents the center thickness of the fourth lens L4, CT5 represents a center thickness of the fifth lens L5, CT34 represents a distance between the third lens L3 and the fourth lens L4 on the optical axis, CT45 represents a distance between the fourth lens L4 and the fifth lens L5 on the optical axis, and CT56 represents a distance between the fifth lens L5 and the sixth lens L6 on the optical axis.

When the expressions (14) and (15) are satisfied, the center thickness of each lens and the spacing between two adjacent lenses can be reasonably designed, the sensitivity of the optical lens 100 is reduced, meanwhile, the optical total length of the optical lens 100 is shortened.

In some embodiments, the optical lens 100 can satisfies the following expression:

$$0.48 < |\theta 12/\theta_C| < 0.56, \quad (16)$$

where θ12 represents the maximum dip angle of the image side surface S12 of the sixth lens L6, and $\theta_c$ represents the maximum chief ray angle of the optical lens 100.

When the expression (16) is satisfied, the chief ray angle of the optical lens 100 can be reasonable controlled, which facilities improving the matching of the optical lens 100 and a sensor, and improving the resolution of the optical lens 100.

In an implementation, the first lens L1, the second lens L2, the third lens L3, the fourth lens L4, the fifth lens L5 and the sixth lens L6 may be aspherical lenses. Optionally, the foregoing lenses are plastic aspheric lenses. Using aspheric lenses can effectively reduce the number of lenses, correct aberration and provide better optical performance. In the embodiment, as an implementation, when each lens of the optical lens 100 is the aspheric lens, each aspheric surface of the optical lens 100 can all satisfy the following expression:

$$z = \frac{ch^2}{1 + \sqrt{1 - (1+k)c^2 h^2}} + \Sigma A_{2i} h^{2i}$$

where z represents a sagittal depth between a point on an aspheric surface and a vertex of the aspheric surface along the optical axis, h represents a distance from the point on the aspheric surface to the optical axis, c represents a paraxial curvature of the surface, k represents quadratic surface coefficient, and $A_{2i}$ represents a 2i-th order aspheric surface coefficient.

The optical lens 100 provided in the embodiments of the disclosure, by using sixth lenses with specific focal powers and reasonably designing lens shapes and a combination of focal powers of the first lens L1, the second lens L2, the third lens L3, the fourth lens L4, the fifth lens L5 and the sixth lens L6, provides a more compact architecture, under the premise of satisfying high resolution. The balance between lens miniaturization and high resolution is better achieved, which can effectively improve the user's camera experience.

The disclosure is further illustrated below in a number of embodiments. In each of the following embodiments, the thickness, radius of curvature, and material selection of each lens of the optical lens 100 are different, and specific differences can be found in parameter tables for each embodiment. In each table, R represents the radius of curvature (unit: millimeter), d represents a spacing distance (unit: millimeter) between the optical surfaces. Nd represents the d-line refractivity of the materials, and Vd represents the Abbe number of the material.

Embodiment 1

In the first embodiment of the disclosure, a vertical distance between the inflection point on the image side surface S2 of the first lens L1 and the optical axis is 0.64 mm, and a vertical distance between the inflection point on the object side surface S9 of the fifth lens L5 and the optical axis is 0.845 mm.

Referring to Table 1, relevant parameters of each lens of the optical lens 100 provided in the first embodiment of the disclosure are shown in the Table 1.

TABLE 1

| Surface No. | | R | d | Nd | Vd |
|---|---|---|---|---|---|
| | Object side surface | — | 400 | | |
| ST | Stop | — | −0.2076 | | |
| S1 | First lens L1 | 1.4530945 | 0.497089 | 1.5445 | 55.987 |
| S2 | | 5.5331834 | 0.086 | | |
| S3 | Second lens L2 | 7.05508748 | 0.193257 | 1.6613 | 20.373 |
| S4 | | 3.1336421 | 0.165401 | | |
| S5 | Third lens L3 | 5.9242211 | 0.360717 | 1.5445 | 55.987 |
| S6 | | −10.079224 | 0.151247 | | |
| S7 | Fourth lens L4 | −1.9139194 | 0.246014 | 1.6397 | 23.529 |
| S8 | | −3.5736153 | 0.212066 | | |
| S9 | Fifth lens L5 | 7.28402932 | 0.558549 | 1.5445 | 55.987 |
| S10 | | −1.3188902 | 0.126124 | | |
| S11 | Sixth lens L6 | −5.1488168 | 0.59952 | 1.5348 | 23.529 |
| S12 | | 1.3527925 | 0.399996 | | |
| S13 | Filter | — | 0.21 | 1.5168 | 64.167 |
| S14 | | — | 0.530699 | | |
| S15 | Imaging surface | — | — | | |

Referring to Table 2-1 and Table 2-2, aspheric surface coefficients of each aspheric surface of the optical lens 100 provided in the first embodiment of the disclosure are shown in the Table 2-1 and Table 2-2.

TABLE 2-1

| Surface No. | k | $A_4$ | $A_6$ | $A_8$ | $A_{10}$ |
|---|---|---|---|---|---|
| S1 | 0.2129 | −0.0281 | 0.1894 | −0.8996 | 2.7908 |
| S2 | 29.2881 | −0.0926 | 0.0575 | 0.2737 | −2.0198 |
| S3 | 68.7498 | −0.1803 | 0.3564 | −0.3839 | −0.7164 |
| S4 | 12.0931 | −0.1780 | 0.0676 | 1.8171 | −8.4692 |
| S5 | −90.2631 | −0.0787 | −0.0702 | −0.6834 | 5.3472 |
| S6 | 83.5022 | −0.0792 | 0.1894 | −1.7734 | 5.4149 |
| S7 | 0.7175 | −0.0377 | 0.0899 | 0.0130 | −0.0326 |
| S8 | 7.3481 | −0.0892 | 0.1045 | −0.2277 | 0.4978 |
| S9 | −51.7614 | 0.0192 | 0.0815 | 0.0050 | −0.6838 |
| S10 | −10.5240 | −0.1476 | 0.8015 | −1.2816 | 1.1344 |
| S11 | −0.7987 | −0.0965 | 0.0330 | −0.0013 | 0.0009 |
| S12 | −8.4290 | −0.1018 | 0.0432 | −0.0198 | 0.0082 |

TABLE 2-2

| Surface No. | $A_{12}$ | $A_{14}$ | $A_{16}$ | $A_{18}$ | $A_{20}$ |
|---|---|---|---|---|---|
| S1 | −5.3196 | 5.3533 | −2.1578 | −0.1937 | 0.0343 |
| S2 | 5.0333 | −9.4528 | 7.6450 | −1.2765 | 0.2712 |
| S3 | 2.0814 | −4.2337 | 1.0801 | 2.4804 | 0.4399 |
| S4 | 16.4629 | −16.6478 | 6.1387 | 0.9947 | −0.5149 |
| S5 | −22.8262 | 52.3354 | −62.2405 | 30.1466 | −0.6454 |
| S6 | −10.2017 | 11.9150 | −8.7172 | 3.6403 | −0.3455 |
| S7 | −0.0659 | −0.0010 | 0.0839 | 0.1008 | −0.1239 |
| S8 | −0.3371 | 0.0275 | 0.0369 | −0.0079 | 0.0016 |
| S9 | 1.2117 | −1.0743 | 0.5271 | −0.1369 | 0.0154 |
| S10 | −0.6744 | 0.2569 | −0.0539 | 0.0046 | 2.05E−05 |
| S11 | −0.0008 | 0.0002 | −1.4E−05 | −6.7E−08 | 4.16E−08 |
| S12 | −0.0021 | 0.0003 | −1.6E−05 | −5.3E−08 | 2.7E−08 |

Figure 2:
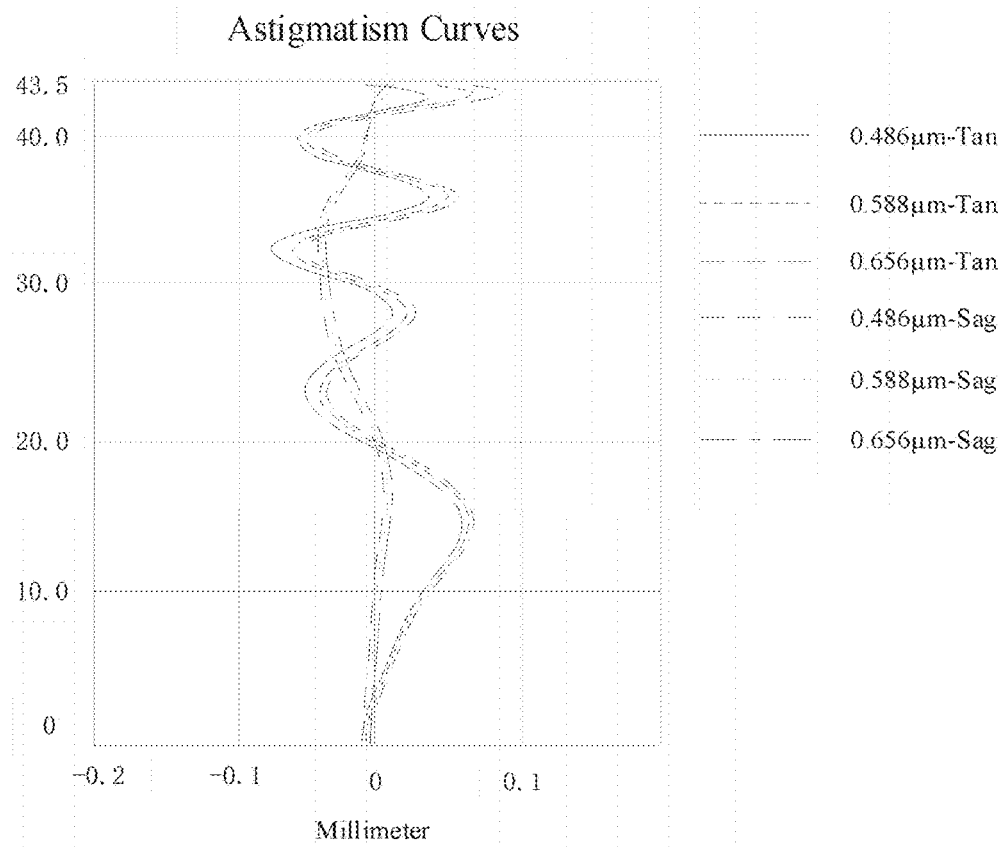
FIG. 2 is a diagram showing astigmatism curves of an optical lens according to a first embodiment of the disclosure.
Figure 3:
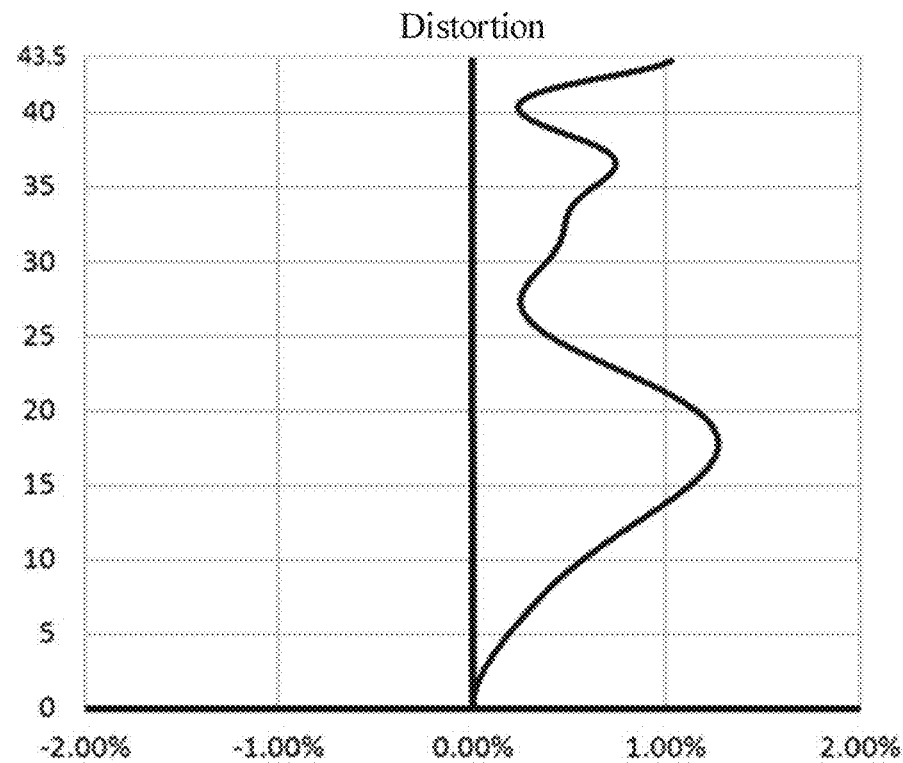
FIG. 3 is a diagram showing a distortion curve of the optical lens according to the first embodiment of the disclosure.
Figure 4:
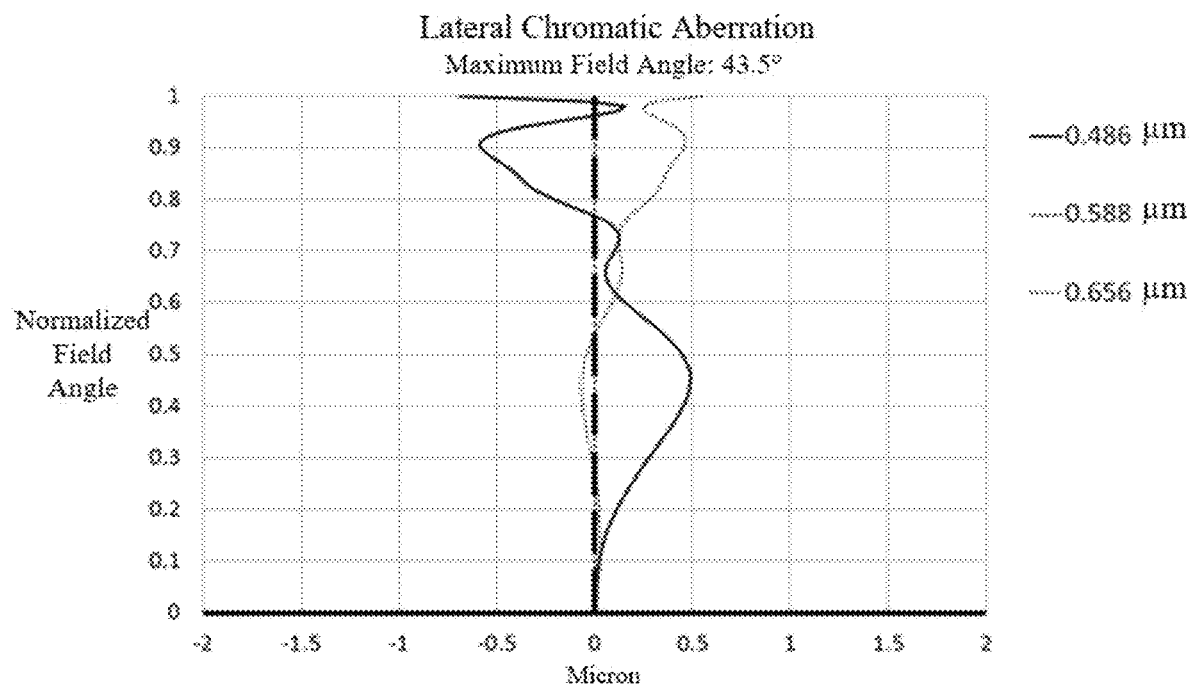
FIG. 4 is a diagram showing lateral chromatic aberration curves of the optical lens according to the first embodiment of the disclosure.
Figure 5:
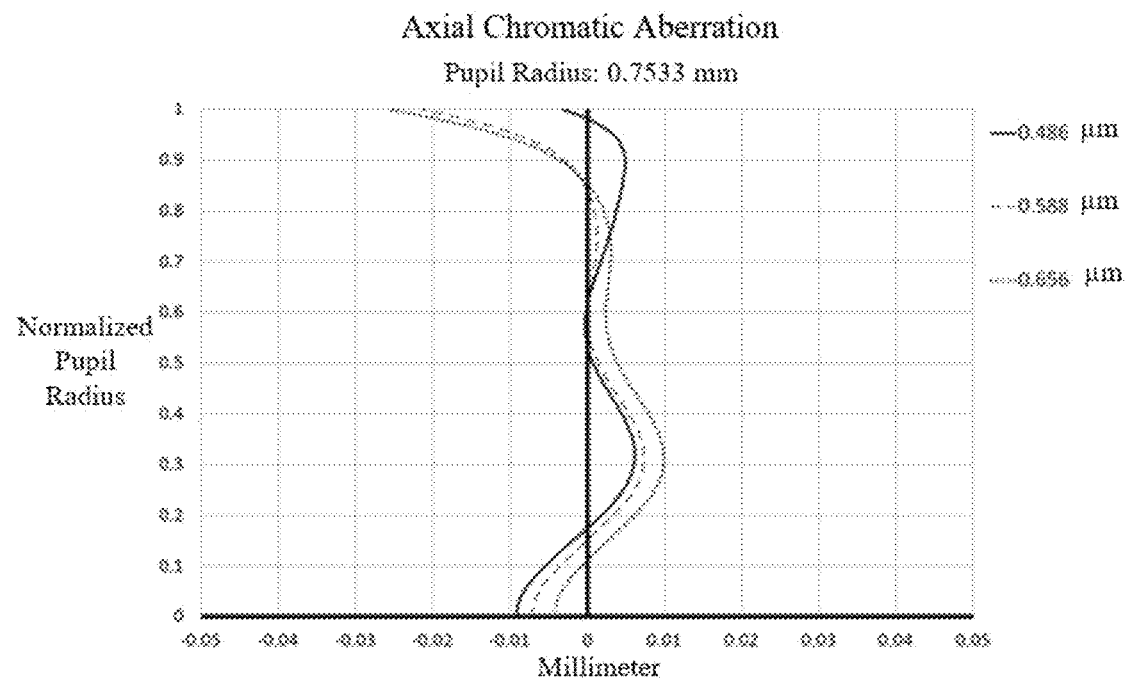
FIG. 5 is a diagram showing axial chromatic aberration curves of the optical lens according to the first embodiment of the disclosure.

The astigmatism curves, the distortion curve, the lateral chromatic aberration curves and the axial chromatic aberration curves of the optical lens 100 are shown in FIG. 2, FIG. 3. FIG. 4 and FIG. 5, respectively.

The astigmatism curves in FIG. 2 illustrate curvature degrees of the tangential image surface and the sagittal image surface. A horizontal axis of FIG. 2 represents an offset (unit: millimeter) and a vertical axis of FIG. 2 represents a field angle (unit: degree). It can be seen from FIG. 2 that the astigmatism of the tangential and sagittal image surfaces is controlled within ±0.1 mm, indicating that the optical lens 100 is good in correcting the astigmatism.

The distortion curve in FIG. 3 illustrates distortions at different image heights on the imaging surface S15. A horizontal axis of FIG. 3 in represents a distortion percentage and a vertical axis of FIG. 3 represents a field angle (unit: degree). It can be seen from FIG. 3 that the optical distortions at different image heights on the imaging surface S15 is controlled within 1.5%, indicating that the optical lens 100 is good in correcting the distortion.

The lateral chromatic aberration curves in FIG. 4 illustrate the chromatic aberrations between the longest and the shortest wavelength at different image heights on the imaging surface S15. A horizontal axis of FIG. 4 represents the lateral chromatic aberration (unit: micron) of each wavelength relative to a central wavelength, and a vertical axis of FIG. 4 represents a normalized field angle. It can be seen in FIG. 4 that the vertical chromatic aberration between the longest and shortest wavelengths is controlled within ±1.0 μm, indicating that the vertical chromatic aberration of the optical lens 100 is well corrected.

FIG. 5 illustrates the axial chromatic aberration curves, where a horizontal axis of FIG. 5 represents an offset (unit:

millimeter), and a vertical axis of FIG. 5 represents a normalized pupil radius. It can be seen from FIG. 5 that the offset of the axial chromatic aberration is controlled within ±0.03 mm, indicating that the optical lens 100 can effectively correct the aberrations of the margin field and the secondary spectrum of the whole imaging surface.

Embodiment 2

The optical lens 100 provided in the second embodiment of the disclosure has roughly the same structure as the optical lens 100 provided in the first embodiment. The main difference is that the radius of curvature and material selection of each lens are different.

In the second embodiment of the disclosure, a vertical distance between the inflection point on the image side surface S2 of the first lens L1 and the optical axis is 0.67 mm, and a vertical distance between the inflection point on the object side surface S9 of the fifth lens L5 and the optical axis is 0.845 mm.

Referring to Table 3, relevant parameters of each lens of the optical lens 100 provided in the second embodiment of the disclosure are shown in the Table 3.

TABLE 3

| Surface No. | | R | d | Nd | Vd |
|---|---|---|---|---|---|
| | Object side surface | — | 400 | | |
| ST | Stop | — | −0.21876 | | |
| S1 | First lens L1 | 1.4660567 | 0.476234 | 1.5445 | 55.987 |
| S2 | | 5.5950548 | 0.081116 | | |
| S3 | Second lens L2 | 7.13042510 | 0.193175 | 1.6613 | 20.373 |
| S4 | | 3.1365222 | 0.158709 | | |
| S5 | Third lens L3 | 5.2645592 | 0.415561 | 1.5445 | 55.987 |
| S6 | | −14.651956 | 0.151137 | | |
| S7 | Fourth lens 14 | −1.8604671 | 0.301127 | 1.6613 | 20.373 |
| S8 | | −3.5435494 | 0.178118 | | |
| S9 | Fifth lens L5 | 8.9927298 | 0.553259 | 1.5445 | 55.987 |
| S10 | | −1.2699443 | 0.163208 | | |
| S11 | Sixth lens L6 | −6.3416875 | 0.628035 | 1.5348 | 55.664 |
| S12 | | 1.2990588 | 0.399996 | | |
| S13 | Filter | — | 0.21 | 1.5168 | 64.167 |
| S14 | | — | 0.524587 | | |
| S15 | Imaging surface | — | — | | |

Referring to Table 4-1 and Table 4-2, the aspheric surface coefficients of each aspheric surface of the optical lens 100 provided in the second embodiment of the disclosure are shown in the Table 4-1 and Table 4-2.

TABLE 4-1

| Surface No. | k | $A_4$ | $A_6$ | $A_8$ | $A_{10}$ |
|---|---|---|---|---|---|
| S1 | 0.2223 | −0.0230 | 0.1781 | −0.8871 | 2.8078 |
| S2 | 31.8498 | −0.0856 | 0.0788 | 0.2822 | −2.0212 |
| S3 | 68.5364 | −0.1574 | 0.3680 | −0.3724 | −0.7024 |
| S4 | 11.8998 | −0.1788 | 0.0781 | 1.8293 | −8.4622 |
| S5 | −39.3252 | −0.0757 | −0.0720 | −0.6762 | 5.3632 |
| S6 | 100.0020 | −0.0663 | 0.1602 | −1.7750 | 5.4357 |
| S7 | 0.9789 | −0.0795 | 0.1241 | 0.0280 | −0.0468 |
| S8 | 7.1795 | −0.1181 | 0.1075 | −0.2241 | 0.5034 |
| S9 | 23.9027 | 0.0125 | 0.0612 | 0.0280 | −0.6817 |
| S10 | −11.1021 | −0.1673 | 0.8151 | −1.2802 | 1.1339 |
| S11 | 1.0389 | −0.0982 | 0.0327 | −0.0013 | 0.0009 |
| S12 | −8.9813 | −0.0965 | 0.0420 | −0.0197 | 0.0082 |

TABLE 4-2

| Surface No. | $A_{12}$ | $A_{14}$ | $A_{16}$ | $A_{18}$ | $A_{20}$ |
|---|---|---|---|---|---|
| S1 | −5.3162 | 5.3355 | −2.1958 | −0.2130 | 0.0824 |
| S2 | 5.0262 | −9.4630 | 7.6451 | −1.3173 | 0.0254 |
| S3 | 2.0970 | −4.2193 | 1.0389 | 2.3565 | 0.2378 |
| S4 | 16.4637 | −16.6546 | 6.1504 | 1.0115 | −0.5126 |
| S5 | −22.7981 | 52.3710 | −62.2364 | 30.0835 | −0.8706 |
| S6 | −10.1877 | 11.9012 | −8.7621 | 3.5906 | −0.3485 |
| S7 | −0.0925 | −0.0114 | 0.1104 | 0.1352 | −0.1390 |
| S8 | −0.3349 | 0.0276 | 0.0364 | −0.0083 | 0.0015 |
| S9 | 1.2093 | −1.0751 | 0.5270 | −0.1369 | 0.0154 |
| S10 | −0.6747 | 0.2568 | −0.0539 | 0.0046 | 2.27E−05 |
| S11 | −0.0008 | 0.0002 | −1.5E−05 | −7.7E−08 | 4.31E−08 |
| S12 | −0.0021 | 0.0003 | −1.6E−05 | −5.6E−08 | 2.8E−08 |

Figure 6:
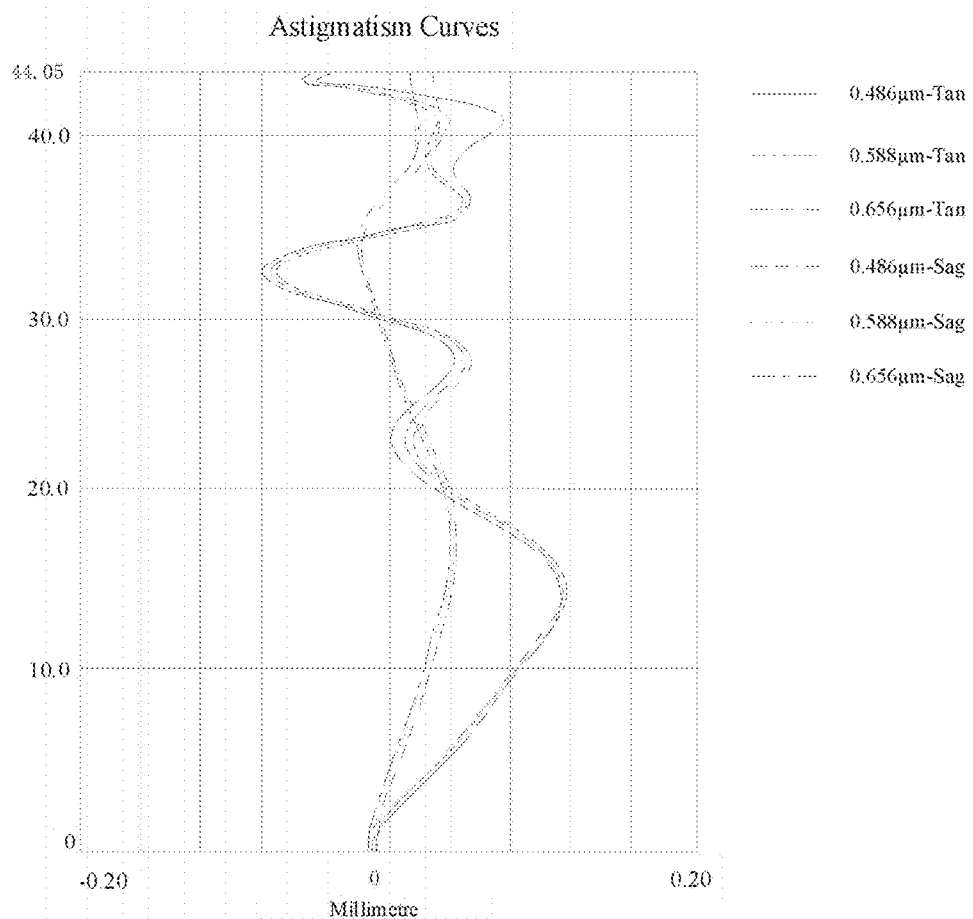
FIG. 6 is a diagram showing astigmatism curves of an optical lens according to a second embodiment of the disclosure.
Figure 7:
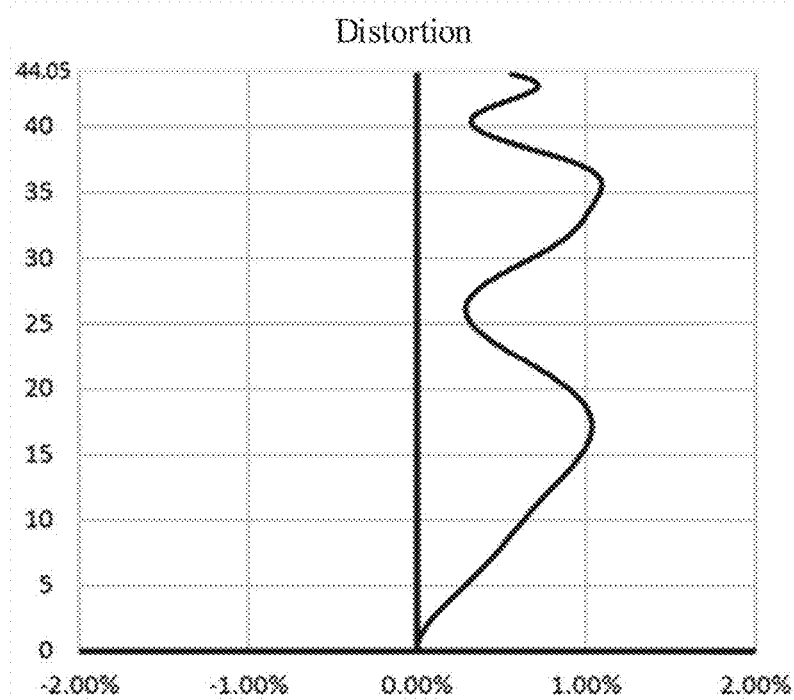
FIG. 7 is a diagram showing a distortion curve of the optical lens according to the second embodiment of the disclosure.
Figure 8:
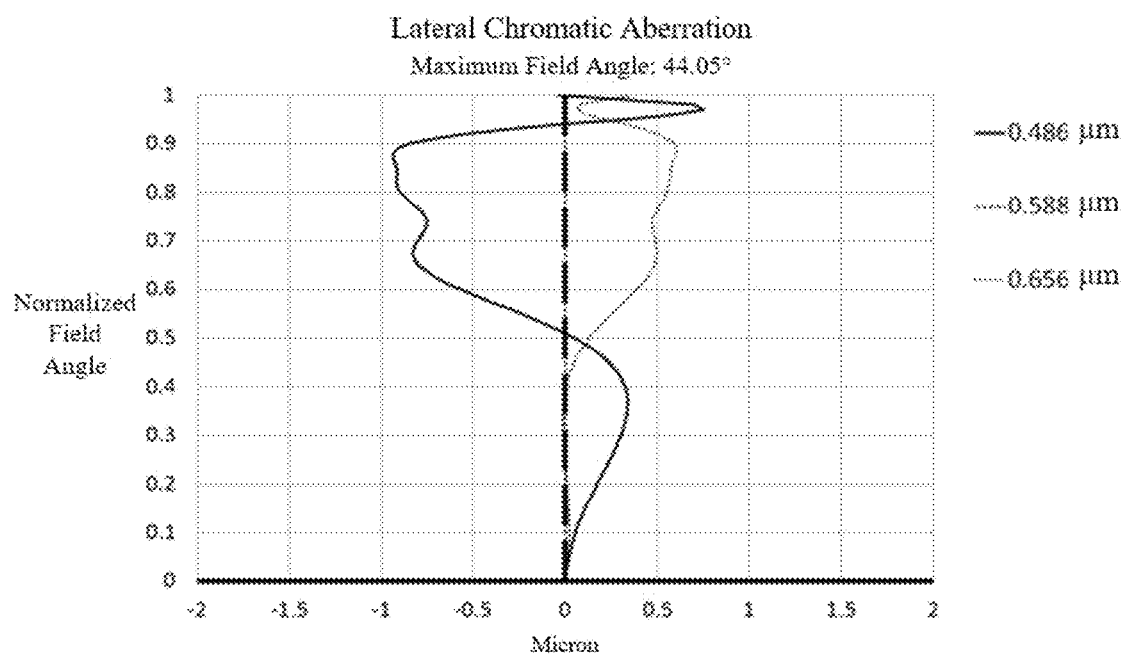
FIG. 8 is a diagram showing lateral chromatic aberration curves of the optical lens according to the second embodiment of the disclosure.
Figure 9:
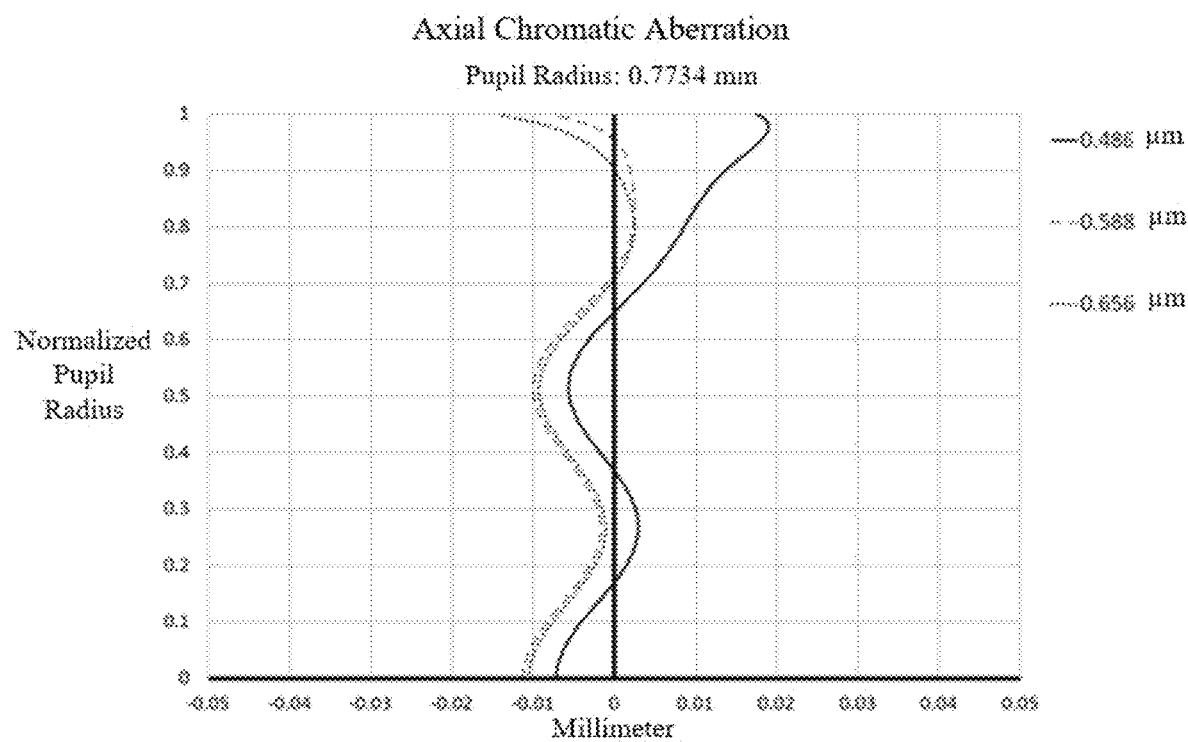
FIG. 9 is a diagram showing axial chromatic aberration curves of the optical lens according to the second embodiment of the disclosure.

The astigmatism curves, the distortion curve, the lateral chromatic aberration curves and the axial chromatic aberration curves of the optical lens 100 are shown in FIG. 6, FIG. 7. FIG. 8 and FIG. 9, respectively.

FIG. 6 illustrates curvature degrees of the tangential image surface and the sagittal image surface. It can be seen from FIG. 6 that the astigmatism of the tangential and sagittal image surfaces is controlled within ±0.1.5 mm, indicating that the optical lens 100 is good in correcting the astigmatism.

FIG. 7 illustrates the distortions at different image heights on the imaging surface S15. It can be seen from FIG. 7 that the optical distortions at different image heights on the imaging surface S15 are controlled within 1.5%, indicating that the optical lens 100 is good in correcting the distortion.

FIG. 8 illustrates the chromatic aberrations between the longest and the shortest wavelength at different image heights on the imaging surface S15. It can be seen in FIG. 8 that the vertical chromatic aberration between the longest and shortest wavelengths is controlled to within ±1.0 μm, indicating that the vertical chromatic aberration of the optical lens 100 is well corrected.

FIG. 9 illustrates the aberrations of the imaging surface on the optical axis It can be seen from FIG. 9 that the offset of the axial chromatic aberration is controlled within ±0.02 mm, indicating that the optical lens 100 can effectively correct the aberrations of the margin field and the secondary spectrum of the whole imaging surface.

Embodiment 3

The optical lens 100 provided in the third embodiment of the disclosure has roughly the same structure as the optical lens 100 provided in the first embodiment. The main difference is that the radius of curvature and material selection of each lens are different.

In the third embodiment of the disclosure, a vertical distance between the inflection point on the image side surface S2 of the first lens L1 and the optical axis is 0.64 mm, and a vertical distance between the inflection point on the object side surface S9 of the fifth lens L5 and the optical axis is 0.815 mm.

Referring to Table 5, relevant parameters of each lens of the optical lens 100 provided in the third embodiment of the disclosure are shown in the Table 5.

TABLE 5

| Surface No. | | R | d | Nd | Vd |
|---|---|---|---|---|---|
| | Object side surface | — | 400 | | |
| ST | Stop | — | −0.20317 | | |
| S1 | First lens L1 | 1.5139718 | 0.533588 | 1.5445 | 55.987 |
| S2 | | 5.0014374 | 0.10374 | | |
| S3 | Second lens L2 | 5.5827459 | 0.19368 | 1.6613 | 20.373 |
| S4 | | 3.2704538 | 0.174823 | | |
| S5 | Third lens L3 | 11.690866 | 0.481045 | 1.5445 | 55.987 |
| S6 | | −5.1709298 | 0.216535 | | |
| S7 | Fourth lens L4 | −1.2394257 | 0.238559 | 1.6397 | 23.529 |
| S8 | | −2.1930647 | 0.087286 | | |
| S9 | Fifth lens L5 | 4.3271276 | 0.52208 | 1.535 | 55.711 |
| S10 | | −1.1469037 | 0.155915 | | |
| S11 | Sixth lens L6 | −2.2060299 | 0.699005 | 1.535 | 55.711 |
| S12 | | 1.6193717 | 0.399996 | | |
| S13 | Filter | — | 0.21 | 1.5168 | 64.167 |
| S14 | | — | 0.446039 | | |
| S15 | The imaging surface | — | — | | |

Referring to Table 6-1 and Table 6-2, the aspheric surface coefficients of each aspheric surface of the optical lens 100 provided in the third embodiment of the disclosure are shown in the Table 6-1 and Table 6-2.

TABLE 6-1

| Surface No. | k | $A_4$ | $A_6$ | $A_8$ | $A_{10}$ |
|---|---|---|---|---|---|
| S1 | 0.2682 | −0.0077 | 0.1093 | −0.8068 | 2.8273 |
| S2 | 20.7101 | −0.1310 | 0.0765 | 0.1556 | −1.9489 |
| S3 | 37.2534 | −0.2723 | 0.3511 | −0.3933 | −0.7514 |
| S4 | 12.3041 | −0.2108 | 0.0055 | 1.9760 | −8.5104 |
| S5 | 0.6865 | −0.1361 | 0.1053 | −0.7078 | 5.0443 |
| S6 | 14.4111 | −0.1497 | 0.2676 | −1.7919 | 5.4279 |
| S7 | 0.2579 | −0.0712 | 0.0475 | 0.3342 | 0.0913 |
| S8 | 1.5067 | −0.2797 | 0.3280 | −0.2758 | 0.4924 |
| S9 | −62.5623 | −0.0159 | 0.0099 | 0.1639 | −0.7501 |
| S10 | −10.4771 | −0.1209 | 0.7592 | −1.2646 | 1.1401 |
| S11 | −18.8597 | −0.0767 | 0.0276 | −0.0014 | 0.0009 |
| S12 | −10.7231 | −0.0661 | 0.0339 | −0.0201 | 0.0085 |

TABLE 6-2

| Surface No. | $A_{12}$ | $A_{14}$ | $A_{16}$ | $A_{18}$ | $A_{20}$ |
|---|---|---|---|---|---|
| S1 | −5.3723 | 5.2688 | −2.1463 | −0.0948 | 0.0661 |
| S2 | 5.3932 | −9.0840 | 7.5712 | −2.1923 | −0.6020 |
| S3 | 2.3252 | −3.8016 | 1.7698 | 1.9738 | −2.6578 |
| S4 | 16.3958 | −16.6750 | 6.4150 | 1.2979 | −1.3369 |
| S5 | −22.8873 | 52.9034 | −62.2835 | 30.2684 | −1.7539 |
| S6 | −9.9795 | 11.8552 | −8.8458 | 3.4709 | −0.3684 |
| S7 | −0.1953 | −0.1352 | 0.0579 | 0.1507 | −0.0716 |
| S8 | −0.3320 | 0.0323 | 0.0362 | −0.0093 | 0.0002 |
| S9 | 1.1840 | −1.0635 | 0.5378 | −0.1360 | 0.0128 |
| S10 | −0.6740 | 0.2546 | −0.0538 | 0.0046 | 2.65E−05 |
| S11 | −0.0008 | 0.0002 | −1.4E−05 | −7.6E−08 | 4.22E−08 |
| S12 | −0.0021 | 0.0003 | −1.7E−05 | −6E−08 | 3.22E−08 |

The astigmatism curves, the distortion curve, the lateral chromatic aberration curves and the axial chromatic aberration curves of the optical lens 100 are shown in FIG. 10, FIG. 11, FIG. 12 and FIG. 13, respectively.

Figure 10:
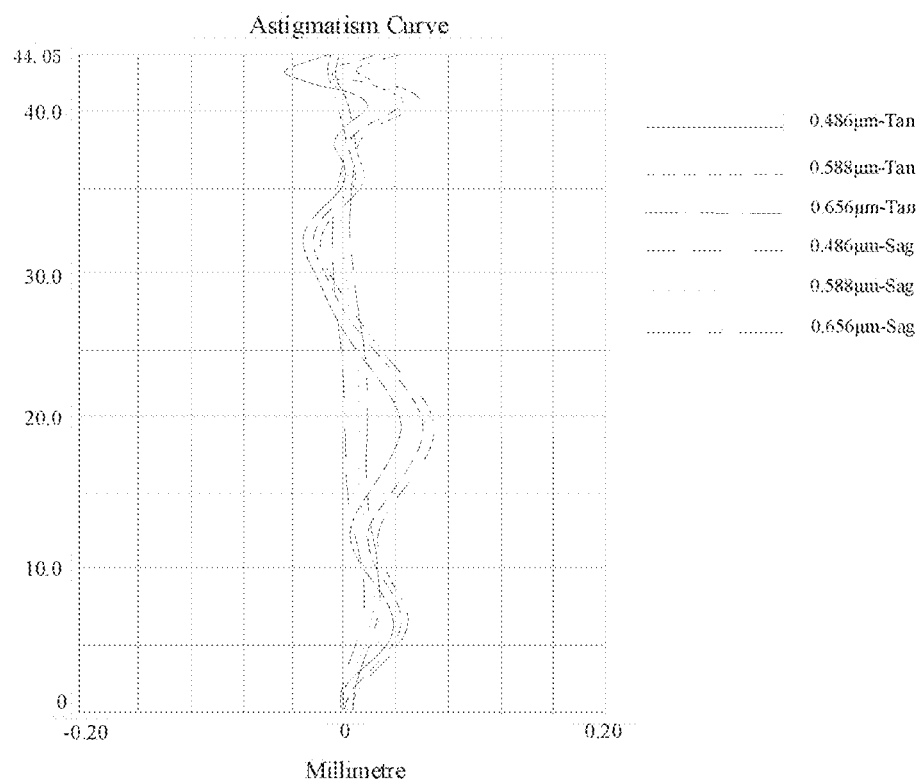
FIG. 10 is a diagram showing astigmatism curves of an optical lens according to a third embodiment of the disclosure.

FIG. 10 illustrates the curvature degrees of the tangential image surface and the sagittal image surface. It can be seen from FIG. 10 that the astigmatism of the tangential and sagittal image surfaces is controlled within ±0.1 mm, indicating that the optical lens 100 is good in correcting the astigmatism.

Figure 11:
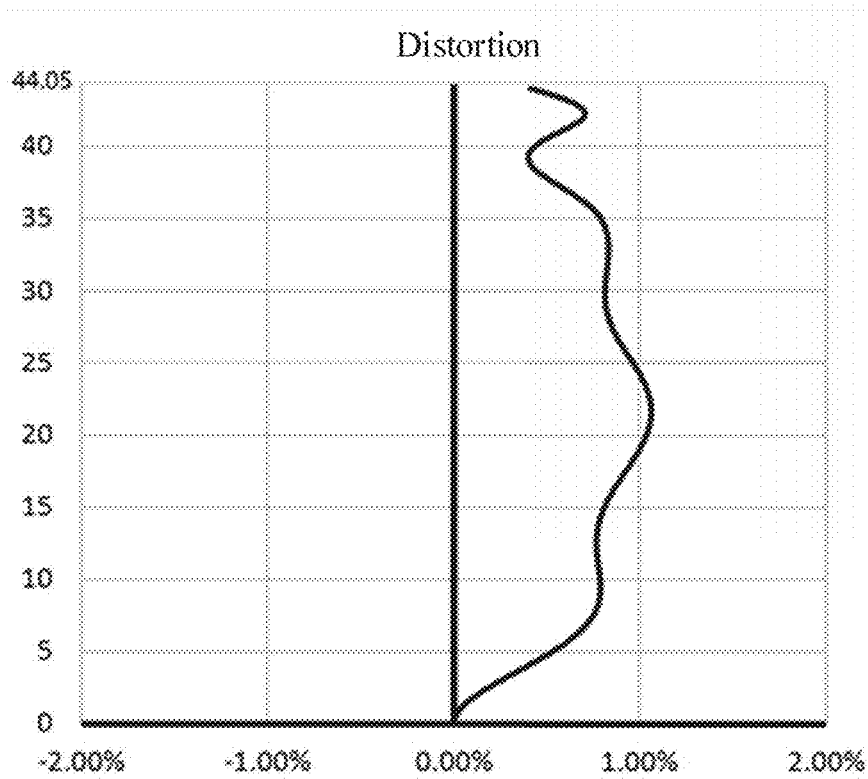
FIG. 11 is a diagram showing a distortion curve of the optical lens according to the third embodiment of the disclosure.

FIG. 11 illustrates the distortions at different image heights on the imaging surface S15. It can be seen from FIG. 11 that the optical distortions at different image heights on the imaging surface S15 are controlled within 1.5%, indicating that the optical lens 100 is good in correcting the distortion.

Figure 12:
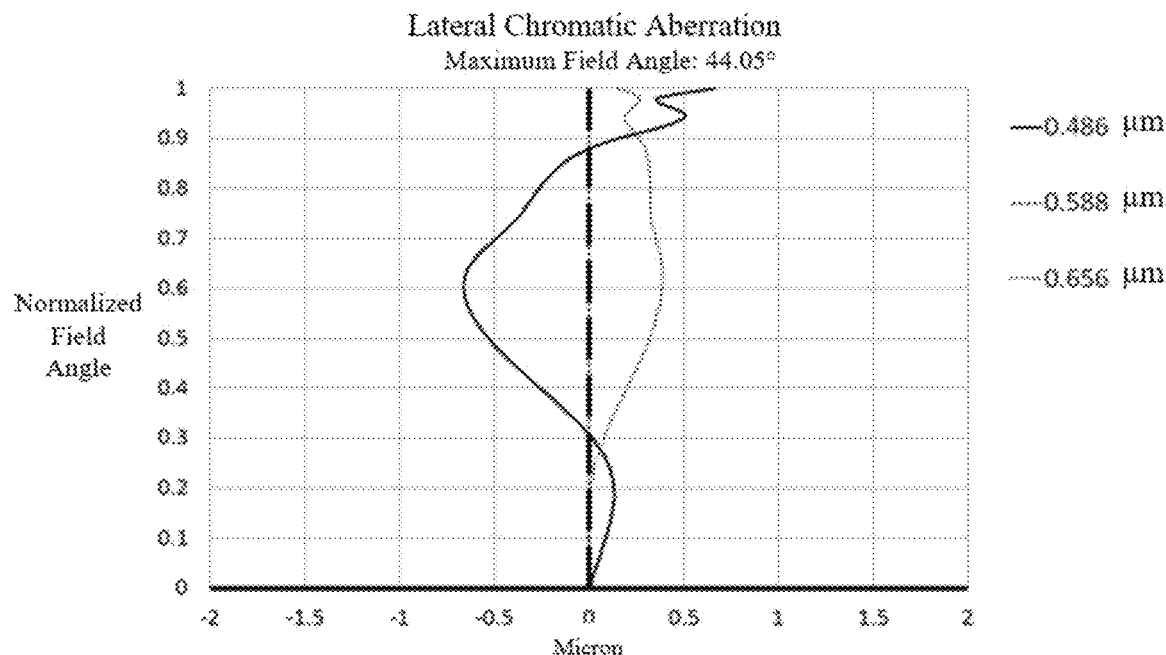
FIG. 12 is a diagram showing lateral chromatic aberration curves of the optical lens according to the third embodiment of the disclosure.

FIG. 12 illustrates the chromatic aberration between the longest and the shortest wavelength at different image heights on the imaging surface S15. It can be seen in FIG. 12 that the vertical chromatic aberration between the longest and shortest wavelengths is controlled to within ±1.0 μm, indicating that the vertical chromatic aberration of the optical lens 100 is well corrected.

Figure 13:
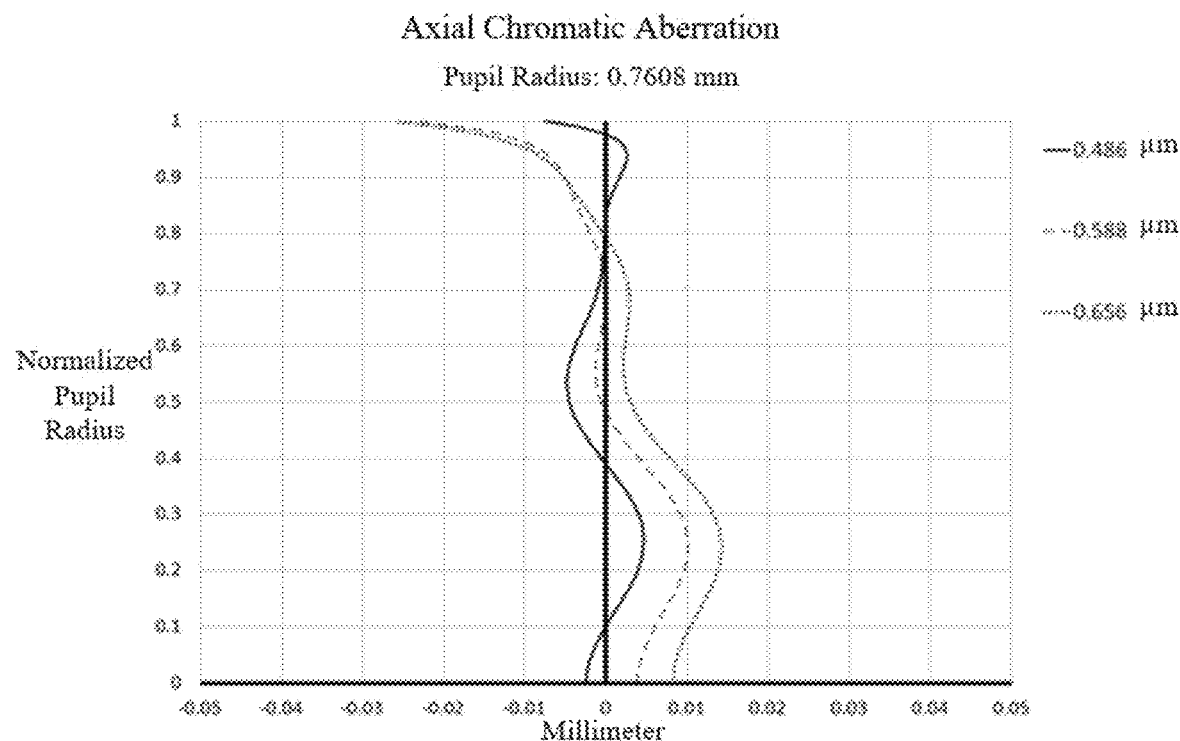
FIG. 13 is a diagram showing axial chromatic aberration curves of the optical lens according to the third embodiment of the disclosure.

FIG. 13 illustrates the aberrations of the imaging surface on the optical axis. It can be seen from FIG. 13 that the offset of the axial chromatic aberration is controlled within ±0.03 mm, indicating that the optical lens 100 can effectively correct the aberrations of the margin field and the secondary spectrum of the whole imaging surface.

Please refer to Table 7, optical characteristics corresponding to above three embodiments are shown. The optical characteristics primarily include a focal length f, an aperture number F #, an entrance pupil diameter EPD, the total optical length TTL, the field angle 2θ, and values corresponding to above expressions. In Table 7, it can be seen that the maximum of the total optical length TTL of the optical lens is 4.46 mm, so that the volume of the optical lens is effectively small; the maximum of the entrance pupil diameter of the optical lens is 1.547 mm, which enables the outer diameter of the front portion of the optical lens to be extremely small; the maximum of the field angle 2θ of the optical lens is 88.1 degree which is relatively large.

can be converted and transmitted to a processor via the printed circuit board 204. The imaging element 210 as described above can be used as the image sensor 303 in this embodiment.

TABLE 7

|  | Embodiment 1 | Embodiment 2 | Embodiment 3 | Remarks |
|---|---|---|---|---|
| f (mm) | 3.388 | 3.403 | 3.421 | |
| F # | 2.25 | 2.20 | 2.25 | |
| TTL (mm) | 4.34 | 4.43 | 4.46 | |
| 2θ (°) | 87 | 88.1 | 88.1 | |
| EPD (mm) | 1.506 | 1.547 | 1.521 | |
| IH (mm) | 3.30 | 3.36 | 3.36 | |
| (TTL/IH) × f | 4.455 | 4.486 | 4.541 | Expression (1) |
| CT1/DM1 | 0.328 | 0.305 | 0.348 | Expression (2) |
| IH/tan(HFOV) | 3.478 | 3.420 | 3.240 | Expression (3) |
| f/EPD | 2.163 | 2.200 | 2.248 | Expression (4) |
| $SAG2_{max} - SAG2$ | 0.030 | 0.033 | 0.023 | Expression (5) |
| f1/f3 | 0.502 | 0.489 | 0.569 | Expression (6) |
| f2/f | −2.544 | −2.515 | −3.580 | Expression (7) |
| f6/f5 | −0.925 | −0.941 | −0.936 | Expression (8) |
| (R3 + R4)/(R3 − R4) | 2.598 | 2.571 | 3.829 | Expression (9) |
| $SAG4_i$ | (0, 0.072) | (0, 0.068) | (0, 0.052) | Expression (10) |
| CT4/DM7 | 0.128 | 0.156 | 0.111 | Expression (11) |
| $SAG9_1 - SAG9$ | 0.336 | 0.324 | 0.394 | Expression (12) |
| (R9 + R10)/(R9 − R10) | 0.693 | 0.753 | 0.581 | Expression (13) |
| CT5/CT4 | 2.240 | 1.837 | 2.188 | Expression (14) |
| CT34 + CT45 + CT56 | 0.489 | 0.492 | 0.459 | Expression (15) |
| $|θ12/θ_C|$ | 0.551 | 0.529 | 0.485 | Expression (16) |

Embodiment 4

Figure 14:
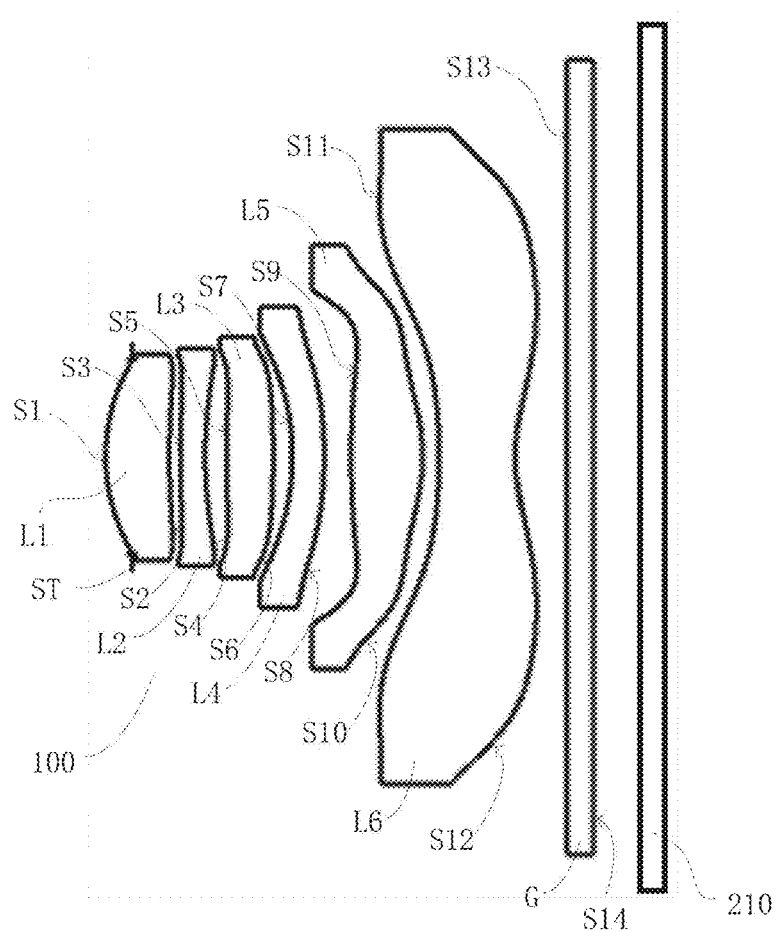
FIG. 14 is a schematic structural diagram of an imaging device according to a fourth embodiment of the disclosure.

An imaging device 200 is provided in the fourth embodiment of the disclosure. Referring to the FIG. 14, the imaging device 200 include an imaging element 210 and the optical lens in any of the above embodiments (for example, the optical lens 100). The imaging element 210 may be a Complementary Metal Oxide Semiconductor (CMOS) graphics sensor, or may be a Charge Coupled Device (CCD) graphics sensor.

The imaging device 200 may be a camera, a terminal mobile and any electronic device which is equipped with the optical lens and in any form. The terminal mobile may be a terminal device such as a smart phone, a smart tablet and a smart reader.

The imaging device 200 provided in the embodiment of the disclosure includes the optical lens 100. Because the optical lens 100 has advantages of a small outer diameter of the front portion, a wide viewing angle and a high imaging quality, the imaging device 200 with the optical lens 100 has advantages of a small outer diameter of the front portion, a wide viewing angle and a high imaging quality.

Embodiment 5

Figure 15:
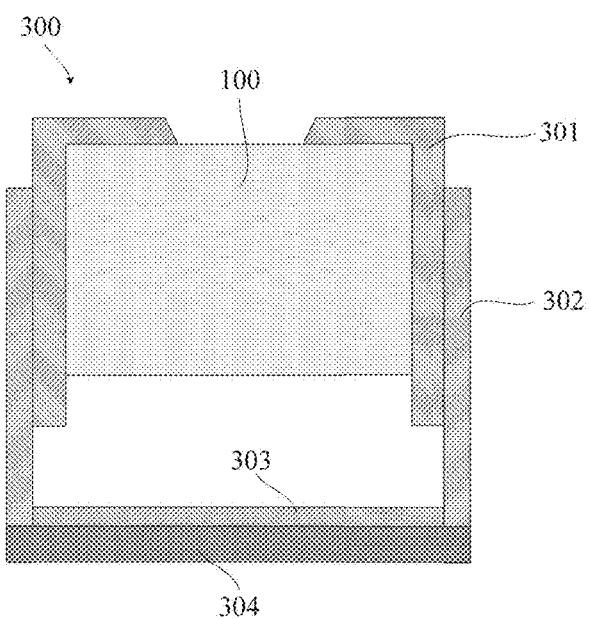
FIG. 15 is a schematic structural diagram of a camera module according to a fifth embodiment of the disclosure.

FIG. 15 illustrates a camera module 300, which includes the optical lens 100 of any embodiment as described above, a barrel 301, a holder 302, an image sensor 303, and a printed circuit board 304. The optical lens 100 is received in the barrel 301, and the barrel 301 is engaged with the holder 302. The image sensor 303 and the printed circuit board 304 are substantially accommodated in the holder 302. The image sensor 303 is opposite to the optical lens 100 and is mounted on the printed circuit board 304. The image sensor 303 is configured for converting light signals into electrical signals, thereby the images formed by the optical lens 100

Embodiment 6

Figure 16:
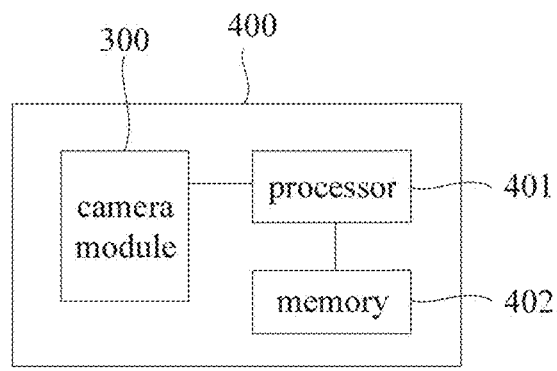
FIG. 16 is a schematic block diagram of a terminal according to a sixth embodiment of the disclosure.
Figure 17:
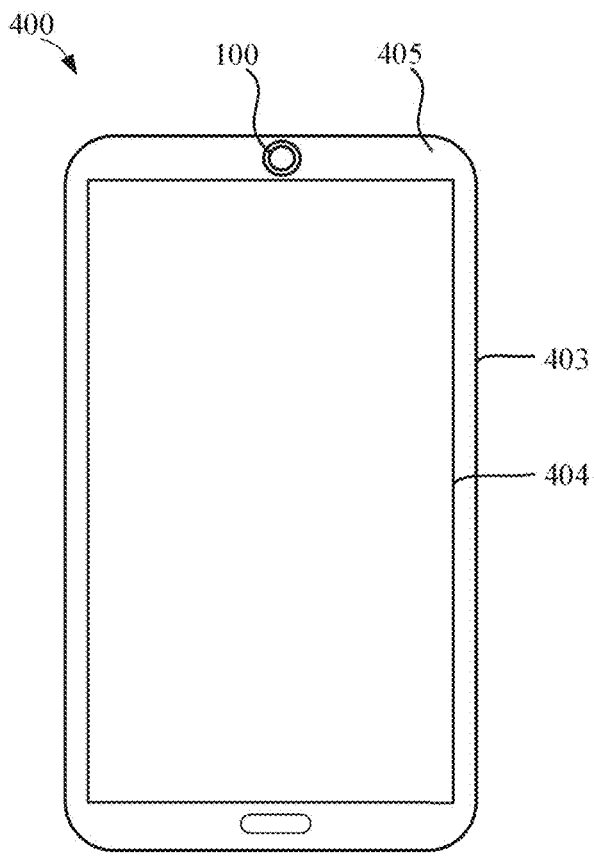
FIG. 17 is a schematic diagram of the terminal according to the sixth embodiment of the disclosure.

As illustrated in FIG. 16 and FIG. 17, the disclosure further provides a terminal 400, which includes the camera module 300 as described above, a processor 401, a memory 402. The terminal 400 may further include a housing 403 and a display screen 404. The camera module 300, the processor 401 and the memory 402 are received in the housing 403. The display screen 404 is engaged with the housing 403. The terminal 400 has a front surface 405, the camera module 300 and the display screen 404 are exposed from the front surface 405. The camera module 300 may be positioned above the display screen 404. The display screen 404 may be a touch screen. The processor 401 is communicated with the printed circuit board 304 and the memory 402, the memory 402 is configured to store the images captured by the camera module 300, and the processor 401 is configured to process the images captured by the camera module 300.

The terminal 400 may be a camera, a terminal mobile and any electronic device which is equipped with the optical lens. One of ordinary skill in the art understands that the terminal 400 also includes other components, such as an antenna, a battery, a memory, an I/O module and so on.

Embodiment 7

Figure 18:
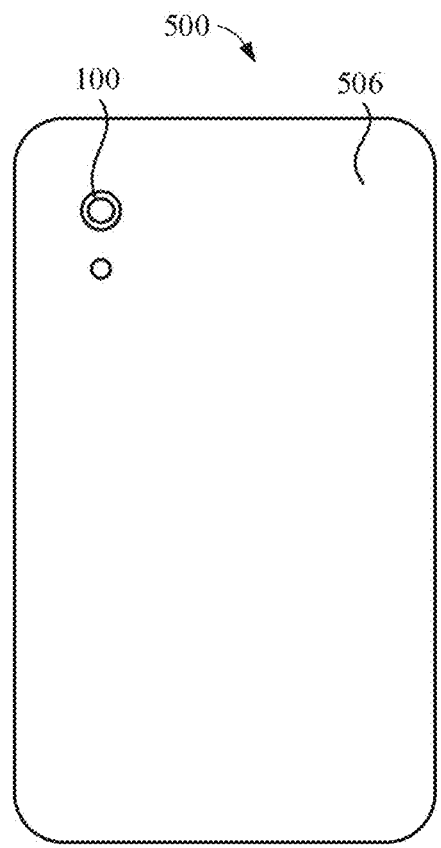
FIG. 18 is a schematic diagram of a terminal according to a seventh embodiment of the disclosure.

As illustrated in FIG. 18, the disclosure further provides a terminal 500, the terminal 500 includes the camera module 300 as described above, and the camera module 300 is exposed from a rear surface 506 of the terminal 500.

In summary, the optical lens 100 provided in the embodiments of the disclosure has at least the following advantages:
(1) Because the stop and each lens shape are designed reasonably, on the one hand, the optical lens 100 has a minor entrance pupil diameter (EPD<1.55 mm), thereby enabling the outer diameter of the front portion of the lens to be extremely small, even up to ø2 mm, to meet the requirement for high screen-to-body ratio; on the other hand, the total length of the optical lens 100 can be shorter (TTL<4.5 mm), and the volume is reduced, which can be more suitable for portable smart electronic products, for example, the development trend of thinness and lightness of the cell phones.

(2) The optical lens 100 has ultra-high definition imaging quality, by using sixth plastic aspherical lenses with specific optical focal lengths and designing specific surface shapes of each lens. The optical lens 100 can be matched with a 48-megapixel CMOS chip to facilitate clear imaging.

(3) The field angle of the optical lens 100 can reach 87°, which can effectively correct the optical distortions and control the distortions within 1.5%. The wide viewing angle and high-definition imaging requirement are satisfied.

The above embodiments only illustrate several implementations of the disclosure, and the descriptions thereof are specific and detailed, but they should not be understood as limiting the scope of the disclosure. It should be noted that, for those of ordinary skill in the art, several modifications and variants can be made without departing from the concept of the disclosure, and they all fall within the protection scope of the disclosure. Therefore, the protection scope of the patent of the disclosure should be subject to the appended claims.

What is claimed is:

1. An optical lens, along an optical axis from an object side to an imaging surface, sequentially comprising:
   a stop;
   a first lens, wherein the first lens has a positive focal power, an object side surface of the first lens is convex, a paraxial region of an image side surface of the first lens is concave, and the image side surface of the first lens has at least one inflection point;
   a second lens, wherein the second lens has a negative focal power, a paraxial region of an object side surface of the second lens is convex, and an image side surface of the second lens is concave;
   a third lens, wherein the third lens has a positive focal power, a paraxial region of an object side surface of the third lens is convex, and an image side surface of the third lens is convex;
   a fourth lens, wherein the fourth lens has a negative focal power, an object side surface of the fourth lens is concave, and an image side surface of the fourth lens is convex;
   a fifth lens, wherein the fifth lens has a positive focal power, a paraxial region of an object side surface of the fifth lens is convex, and a paraxial region of an image side surface of the fifth lens is convex, and both the object side surface and the image side surface of the fifth lens have at least one inflection point; and
   a sixth lens, wherein the sixth lens has a negative focal power, a paraxial region of an object side surface of the sixth lens is concave, a paraxial region of an image side surface of the sixth lens is concave, and the image side surface of the sixth lens has at least one inflection point;
   wherein the first lens, the second lens, the third lens, the fourth lens, the fifth lens and the sixth lens are aspherical lenses;
   wherein the optical lens meets the expressions:

$4.4 \text{ mm} < (TTL/IH) \times f < 4.6 \text{ mm}$; and $0.02 \text{ mm} < SAG2_{max} - SAG2 < 0.04 \text{ mm}$;

where TTL represents a distance on the optical axis from the object side surface of the first lens to the imaging surface, IH represents half an actual image height of the optical lens on the imaging surface, f represents a focal length of the optical lens, $SAG2_{max}$ represents a maximum sagittal depth of the image side surface of the first lens, and SAG2 represents a fringe sagittal depth of the image side surface of the first lens.

2. The optical lens as claimed in claim 1, wherein the optical lens meets the expression:

$0.3 < CT1/DM1 < 0.35$;

where CT1 represents a center thickness of the first lens, and DM1 represents a diameter of the object side surface of the first lens.

3. The optical lens as claimed in claim 1, wherein the optical lens meets the expression:

$3.23 \text{ mm} < IH/\tan(HFOV) < 3.48 \text{ mm}$;

where HFOV represents half a maximum field of view of the optical lens.

4. The optical lens as claimed in claim 1, wherein the optical lens meets the expression:

$2.1 < f/EPD < 2.3$;

where EPD represents an entrance pupil diameter of the optical lens.

5. The optical lens as claimed in claim 1, wherein the optical lens meets the expressions:

$0.4 < f1/f3 < 0.6$;

$-3.6 < f2/f < -2.5$;

$-0.95 < f6/f5 < 0$;

where f1 represents a focal length of the first lens, f2 represents a focal length of the second lens, f3 represents a focal length of the third lens, f5 represents a focal length of the fifth lens, and f6 represents a focal length of the sixth lens.

6. The optical lens as claimed in claim 1, wherein the optical lens meets the expression:

$2.5 < (R3+R4)/(R3-R4) < 3.9$;

$0 \text{ mm} < SAG4_i < 0.08 \text{ mm}$;

where R3 represents a radius of curvature of the object side surface of the second lens, R4 represents a radius of curvature of the image side surface of the second lens, and $SAG4_i$ represents a sagittal depth of a point on the image side surface of the second lens and i represents a distance from the point to the optical axis.

7. The optical lens as claimed in claim 1, wherein the optical lens meets the expression:

$0.09 < CT4/DM7 < 0.16$;

where CT4 represents a center thickness of the fourth lens, and DM7 represents a diameter of the object side surface of the fourth lens.

8. The optical lens as claimed in claim 1, wherein the optical lens meets the expressions:

$0.32 \text{ mm} < SAG9_1 - SAG9 < 0.4 \text{ mm}$;

$0.5 < (R9+R10)/(R9-R10) < 0.8$;

where $SAG9_1$ represents a sagittal depth of the object side surface of the fifth lens at the inflection point, SAG9 represents a fringe sagittal depth of the object side surface of the fifth lens, R9 represents a radius of curvature of the object side surface of the fifth lens, and R10 represents a radius of curvature of the image side surface of the fifth lens.

9. The optical lens as claimed in claim 1, wherein the optical lens meets the expressions:

$1.8 < CT5/CT4 < 2.3$;

$0.45 \text{ mm} < CT34 + CT45 + CT56 < 0.5 \text{ mm}$;

where CT4 represents a center thickness of the fourth lens, CT5 represents a center thickness of the fifth lens, CT34 represents a distance between the third lens and the fourth lens on the optical axis, CT45 represents a distance between the fourth lens and the fifth lens on the optical axis, and CT56 represents a distance between the fifth lens and the sixth lens on the optical axis.

10. The optical lens as claimed in claim 1, wherein the optical lens meets the expression:

$0.48 < |\theta 12/\theta c| < 0.56$;

where θ12 represents a maximum dip angle of the image side surface of the sixth lens, θc represents a maximum incidence angle of a principal ray of the optical lens.

11. A camera module, comprising an optical lens, a barrel, a holder and an image sensor, wherein the optical lens is received in the barrel, the barrel is engaged with the holder, the image sensor is received in the holder and opposite to the optical imaging lens, the optical lens, along an optical axis from an object side to an imaging surface, sequentially comprises:

a stop;
a first lens, wherein the first lens has a positive focal power, an object side surface of the first lens is convex, an image side surface of the first lens is concave at a paraxial region thereof and has at least one inflection point;
a second lens, wherein the second lens has a negative focal power, an object side surface of the second lens is convex at a paraxial region thereof, and an image side surface of the second lens is concave;
a third lens, wherein the third lens has a positive focal power, an object side surface of the third lens is convex at a paraxial region thereof, and an image side surface of the third lens is convex;
a fourth lens, wherein the fourth lens has a negative focal power, an object side surface of the fourth lens is concave, and an image side surface of the fourth lens is convex;
a fifth lens, wherein the fifth lens has a positive focal power, both an object side surface and an image side surface of the fifth lens are convex at a paraxial region thereof and have at least one inflection point; and
a sixth lens, wherein the sixth lens has a negative focal power, an object side surface of the sixth lens is concave at a paraxial region thereof, and an image side surface of the sixth lens is concave at a paraxial region thereof and has at least one inflection point;
wherein the first lens, the second lens, the third lens, the fourth lens, the fifth lens and the sixth lens are aspherical lenses;
wherein the optical lens meets the expressions:

$4.4 \text{ mm} < (TTL/IH) \times f < 4.6 \text{ mm}$;

$0.3 < CT1/DM1 < 0.35$;

where TTL represents a distance on the optical axis from the object side surface of the first lens to the imaging surface, IH represents half an actual image height of the optical lens on the imaging surface, f represents a focal length of the optical lens, CT1 represents a center thickness of the first lens, and DM1 represents a diameter of the object side surface of the first lens.

12. The camera module as claimed in claim 11, wherein the first lens, the second lens, the third lens, the fourth lens, the fifth lens and the sixth lens are plastic.

13. The camera module as claimed in claim 11, wherein the optical lens meets the expressions:

$0.02 \text{ mm} < SAG2_{max} - SAG2 < 0.04 \text{ mm}$;

where $SAG2_{max}$ represents a maximum sagittal depth of the image side surface of the first lens, and SAG2 represents a fringe sagittal depth of the image side surface of the first lens.

14. The camera module as claimed in claim 11, wherein the optical lens meets the expressions:

$3.23 \text{ mm} < IH/\tan(HFOV) < 3.48 \text{ mm}$;

$2.1 < f/EPD < 2.3$;

where HFOV represents half a maximum field of view of the optical lens, EPD represents an entrance pupil diameter of the optical lens.

15. The camera module as claimed in claim 11, wherein the optical lens meets the expressions:

$0.4 < f1/f3 < 0.6$;

$-3.6 < f2/f < -2.5$;

$-0.95 < f6/f5 < 0$;

where f1 represents a focal length of the first lens, f2 represents a focal length of the second lens, f3 represents a focal length of the third lens, f5 represents a focal length of the fifth lens, and f6 represents a focal length of the sixth lens.

16. The camera module as claimed in claim 11, wherein the optical lens meets the expressions:

$2.5 < (R3+R4)/(R3-R4) < 3.9$;

$0 \text{ mm} < SAG4_i < 0.08 \text{ mm}$;

$0.32 \text{ mm} < SAG9_1 - SAG9 < 0.4 \text{ mm}$;

$0.5 < (R9+R10)/(R9-R10) < 0.8$;

where R3 represents a radius of curvature of the object side surface of the second lens, R4 represents a radius of curvature of the image side surface of the second lens, $SAG4_i$ represents a sagittal depth of a point on the image side surface of the second lens, i represents a distance from the point to the optical axis, $SAG9_1$ represents a sagittal depth of the object side surface of the fifth lens at the inflection point, SAG9 represents a fringe sagittal depth of the object side surface of the fifth lens, R9 represents a radius of curvature of the object side surface of the fifth lens, and R10 represents a radius of curvature of the image side surface of the fifth lens.

17. The camera module as claimed in claim 11, wherein the optical lens meets the expressions:

$0.09 < CT4/DM7 < 0.16$;

$1.8 < CT5/CT4 < 2.3$;

$0.45 \text{ mm} < CT34 + CT45 + CT56 < 0.5 \text{ mm}$;

where CT4 represents a center thickness of the fourth lens, DM7 represents a diameter of the object side surface of the fourth lens, CT5 represents a center thickness of the fifth lens, CT34 represents a distance between the third lens and the fourth lens on the optical axis, CT45 represents a distance between the fourth lens and the fifth lens on the optical axis, and CT56 represents a distance between the fifth lens and the sixth lens on the optical axis.

18. The camera module as claimed in claim 11, wherein the optical lens meets the expressions:

$$0.48 < |\theta12/\theta c| < 0.56;$$

where $\theta12$ represents a maximum dip angle of the image side surface of the sixth lens, $\theta c$ represents a maximum incidence angle of a principal ray of the optical lens.

19. A terminal, comprising a camera module, a memory and a processor, the memory and the camera module being electrically connected with the processor, the memory being configured to store image data, the processor being configured to process the image data, the camera module comprising an optical lens, a barrel, a holder and an image sensor, the optical lens being received in the barrel, the barrel being engaged with the holder, the image sensor being received in the holder and opposite to the optical lens and configured to sense and generate the image data, the optical lens, along an optical axis from an object side to an imaging surface, sequentially comprising:
   a stop;
   a first lens, wherein the first lens has a positive focal power, an object side surface of the first lens is convex, a paraxial region of an image side surface of the first lens is concave, and the image side surface of the first lens has at least one inflection point;
   a second lens, wherein the second lens has a negative focal power, a paraxial region of an object side surface of the second lens is convex, and an image side surface of the second lens is concave;
   a third lens, wherein the third lens has a positive focal power, a paraxial region of an object side surface of the third lens is convex, and an image side surface of the third lens is convex;
   a fourth lens, wherein the fourth lens has a negative focal power, an object side surface of the fourth lens is concave, and an image side surface of the fourth lens is convex;
   a fifth lens, wherein the fifth lens has a positive focal power, a paraxial region of an object side surface of the fifth lens is convex, and a paraxial region of an image side surface of the fifth lens is convex, and both the object side surface and the image side surface of the fifth lens have at least one inflection point; and
   a sixth lens, wherein the sixth lens has a negative focal power, a paraxial region of an object side surface of the sixth lens is concave, a paraxial region of an image side surface of the sixth lens is concave, and the image side surface of the sixth lens has at least one inflection point;
   wherein the first lens, the second lens, the third lens, the fourth lens, the fifth lens and the sixth lens are aspherical lenses;
   wherein the optical lens meets the expressions:

$$4.4 \text{ mm} < (TTL/IH) \times f < 4.6 \text{ mm};$$

$$0.3 < CT1/DM1 < 0.35;$$

where TTL represents a distance on the optical axis from the object side surface of the first lens to the imaging surface, IH represents half an actual image height of the optical lens on the imaging surface, f represents a focal length of the optical lens, CT1 represents a center thickness of the first lens, and DM1 represents a diameter of the object side surface of the first lens.

* * * * *